Figure 1:
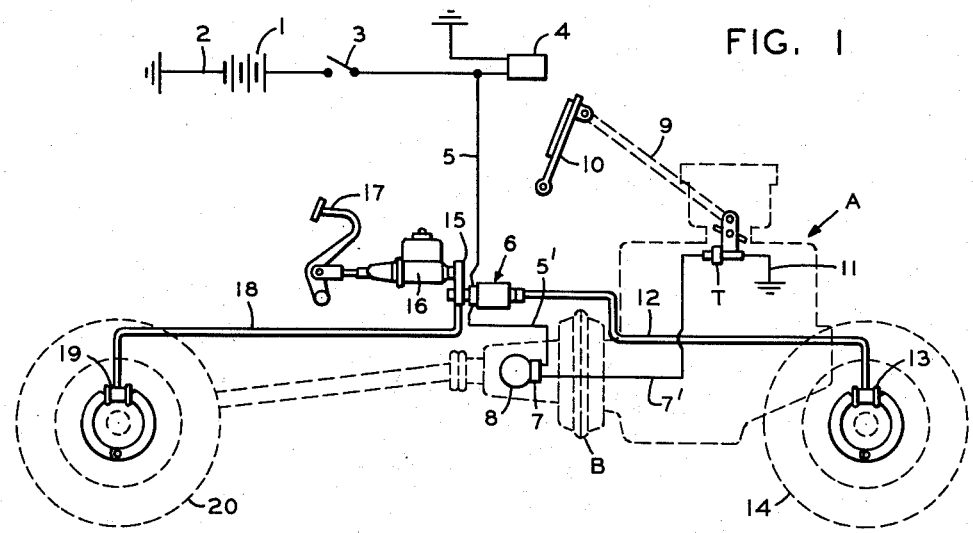

Oct. 8, 1963    J. E. PAPIN    3,106,221
ANTI-CREEP BRAKE MECHANISM
Filed Nov. 22, 1961    2 Sheets-Sheet 1

INVENTOR
JOSEPH E. PAPIN
BY
Gravely, Lieder & Woodruff
ATTORNEYS

Oct. 8, 1963 J. E. PAPIN 3,106,221
ANTI-CREEP BRAKE MECHANISM
Filed Nov. 22, 1961 2 Sheets-Sheet 2

INVENTOR
JOSEPH E. PAPIN
BY
Gravely, Lieder & Woodruff
ATTORNEYS

United States Patent Office 3,106,221
Patented Oct. 8, 1963

3,106,221
ANTI-CREEP BRAKE MECHANISM
Joseph E. Papin, Berkeley, Mo., assignor to Wagner Electric Corporation, St. Louis, Mo., a corporation of Delaware
Filed Nov. 22, 1961, Ser. No. 154,262
7 Claims. (Cl. 137—598)

This invention relates to vehicles in general having automatic or semi-automatic transmissions and is more particularly directed to certain new and useful improvements in creep-preventing means associated with an automotive hydraulic braking system.

The primary object of the invention is to provide an electrically operated mechanism for a brake holding device which will permit safe operation thereof under all road conditions.

Another object of the invention is to provide an improved anti-creep mechanism that is activated to an operative condition magnetically with a relatively smaller coil required therefor.

A further object of the invention is to provide a hydraulic brake system which incorporates a check valve interposed between the master cylinder of the system and the brake fluid conduits leading to the brake assemblies on one set of wheels of the vehicle for trapping brake fluid therein, and which incorporates a solenoid actuated check valve located in the hydraulic circuit for one set of wheels controlled by a speed responsive pressure switch.

A further object is to provide an anti-creep device of simplified construction, yet positive acting in operation.

These and still other objects and advantages will become more apparent hereinafter.

Figure 2:
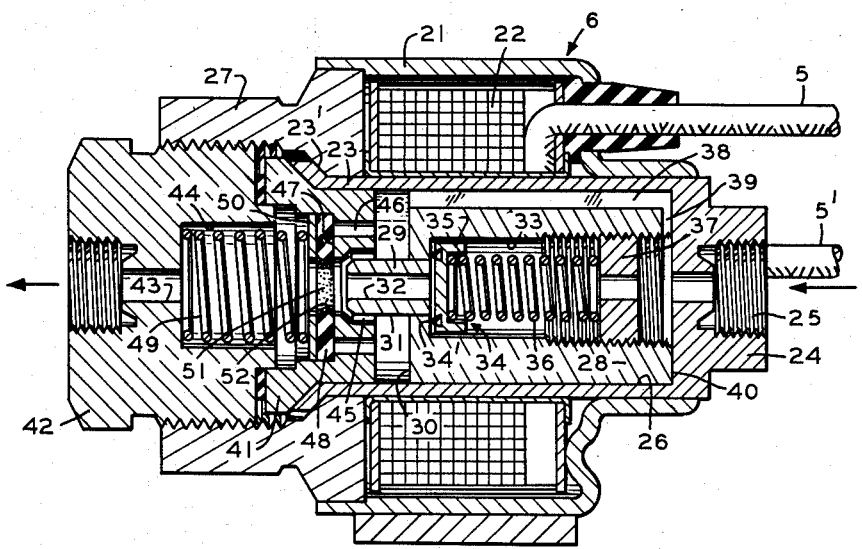
Figure 3:
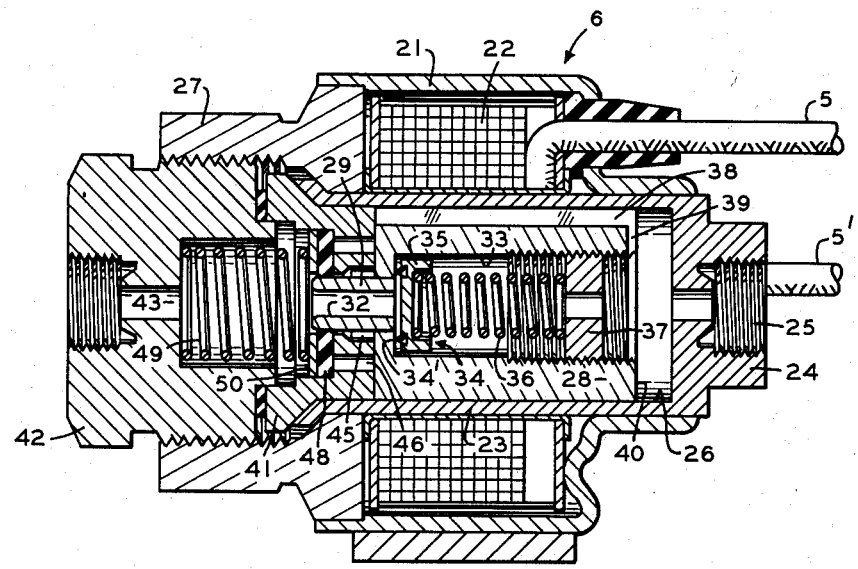

In the accompanying drawings wherein like reference characters refer to like parts wherever they occur:

FIG. 1 is a diagrammatic view of the hydraulic braking and electrical systems for a vehicle incorporating creep-preventing means embodying the invention, FIG. 2 is an enlarged longitudinal sectional view of the anti-creep check valve in its inoperative position, and FIG. 3 is an enlarged longitudinal sectional view of the check valve shown in an operative position.

Referring to FIG. 1, there is shown the hydraulic braking and electrical systems of a vehicle A having an automatic or semi-automatic transmission designated by the letter B. The numeral 1 indicates a battery having its negative terminal customarily connected to ground by lead 2 and on its positive side connected through an ignition switch 3 to an ignition coil 4. Branching from the line intermediate the ignition coil 4 and the ignition switch 3 is a lead 5 secured to one terminal of the coil of the solenoid actuated check valve or anti-creep mechanism 6, the opposite terminal of the coil being connected by a lead 5' with one terminal of a conventional pressure switch 7 mounted on the pressure pump 8 of the transmission B. The other terminal of the pressure switch 7 is connected by a lead 7' to a throttle switch T of the type fully described in United States Patent No. 2,683,781 dated July 13, 1954, which switch T is connected through suitable linkage 9 to an accelerator foot pedal 10. When the pedal 10 is depressed, the switch T will be open, and upon release of the pedal 10 to inoperative position, the switch T will be shifted into circuit closing position. The opposite side of the throttle switch T is connected by lead 11 to ground to complete the electrical circuit for the check valve coil.

Extending from the outlet end of the check valve 6 is a conduit 12 for passage of brake fluid to the wheel brake cylinders 13 of the brake assemblies of the forward wheels 14. The inlet end of the valve 6 is connected to a suitable tube fitting 15 through which brake fluid passes to valve 6 from a master brake cylinder 16 actuated by a foot pedal 17. Also connected to the master cylinder 16 by the fitting 15 is a rearwardly extending conduit 18 which communicates with the wheel brake cylinders 19 of the rear wheels 20.

Referring now to FIGS. 2 and 3, it will be noted that the check valve 6 comprises a casing 21 having a solenoid coil 22 disposed therein, the terminals of which are connected to leads 5, 5', as described hereinabove. Extending through the casing 21 and the bore of coil 22 is a non-magnetic guide member 23 having a rearwardly projecting closed end portion 24 which is axially bored and tapped, as at 25, for engagement with the fitting 15 to provide the inlet passage. This guide member 23 is counterbored, as at 26, and flared at its forward end 23' for snug, surface-wise engagement on its outer face against the interior face of a casing member 27 for enclosing the coil 22 within the forward end of the casing 21. An armature 28 is received within the counterbore 26 of guide member 23 for sliding movement therein, the armature or plunger 28 having a forwardly projecting member or tubular extension 29 extending from the forward face 30 of the armature. The member 29 has an outer surface 31 and is centrally bored to form a passage 32, and the armature 28 has a counterbore 33 in axial alignment with inlet connection 25 of the guide member 23 to provide communication between the passage 32 and the inlet 25. A valve assembly 34 including a resilient annular valve 34' carried by a disc 35 is disposed within the counterbore 33, the rightward end of the disc or supporting member 35 providing a bearing surface for one end of a valve spring 36 which urges valve assembly 34 forwardly. The other end of valve spring 36 bears against an adjustable plug 37 threadedly engaged within the armature 28 for loading the spring 36. The valve 34' is normally biased by the spring 36 into sealed engagement with the armature wall circumscribing the passage 32 to interrupt communication of the inlet 25 with the passage 32 through the armature counterbore 33.

The armature or plunger 28 is preferably hexagonal in cross-section to provide spaced line contacts for minimal frictional sliding engagement with the counterbore 26, and to form longitudinal passages 38 between the plunger and counterbore thereby accommodating free fluid flow therethrough. A radial recess or the like 39 is formed in the rear end 40 of the plunger 28 to provide fluid communication with the longitudinal passages 38 and the axial end portions of the plunger to assure fluid flow between the inlet 25 and the front face 30 circumscribing the tubular extension 29.

A valve stop or abutment member 41 is secured within the flared end portion 23' of the guide member 23 and the coil enclosing casing member 27 by an end closing member 42 having an outlet passage 43 and a counterbore 44 in communication with the stop 41. The abutment member 41 has an enlarged central bore or recess 45 adapted to receive the tubular extension 29 of the armature 28, and a plurality of ports 46 are formed through the member 41 outwardly of the central bore 45. The forward side of the abutment member 41 is recessed, at 47, in communication with the outlet 43, and a resilient annular sealing member such as O-ring seal 48, is biased by a spring 49 and retainer 50 into contact with the abutment member 41 closing the outlet sides of the ports 46. The seal 48 has an opening 51 defined by an annular rounded sealing lip 52 adapted to sealingly receive the outer surface 31 of the tubular extension 29 therein.

In operation of the check valve 6, pressure fluid is displaced by the master cylinder 16, due to operator actuation of the foot pedal 17, to the rear wheel cylinders 18 and through the inlet connection 25 of the check valve 6. Fluid will pass through the passages 38 and 39 around the plunger 28 and through the central opening 45 and counterbore 44 to the outlet 43 and the front wheel cylinders 13. It is apparent that the pressure fluid flowing will also tend to flow through the ports 46 to move the O-ring seal 48 leftwardly out of engagement with the abutment member 41 against the compressive force of the spring 49.

When the vehicle has reached a predetermined rate of deceleration, at or below the speed at which the pump pressure is reduced to close the pressure switch 7, the electrical circuit will be completed to energize the coil 22 due to the fact that the throttle switch T is closed when the accelerator 10 is released to apply the brake pedal 17. Energization of the solenoid coil 22 produces a magnetic attraction by the abutment member 41 for moving the plunger 28 leftwardly against the member 41, FIG. 3, so that the tubular extension 29 projects through the central opening 45 in the abutment member 41 and causes a restriction in pressure fluid flow through this bore 45. It should be noted that the O-ring seal 48 is moved away from the abutment member 41 and ports 46 so that the extension 29 is not seated in the O-ring seal and, therefore, movement of the plunger 28 is not opposed by any spring force and does not interrupt pressure fluid communication to the wheel cylinders 13. The solenoid coil 22 may be energized by any type of switch responsive to deceleration of the vehicle, but it is preferred to use the speed responsive switch 7, which will generally be closed when the vehicle speed is about 5 mph and below, so that the braking effort will be substantially completed. Inasmuch as the fluid pressures acting on the plunger 28 are self-cancelling during initial brake actuation and plunger movement is not opposed by spring forces, a relatively low E.M.F. is required to move the plunger against its abutment. However, magnetic attraction between the plunger 28 and abutment 41 resists relatively large forces tending to cause separation.

At the end of a braking application when the vehicle is stopped and the foot pedal 17 is released to de-energize the master cylinder 16, a pressure differential is established across the abutment member 41 and fluid pressure on the outlet side of the check valve 6 will act on the effective area of the O-ring seal 48 to re-engage the seal 48 with the outlet side of the abutment member 41 to close the ports 46. The seal 48 is thus moved rightwardly into sealed engagement with the extension 29 to prevent pressure fluid flow through the central bore 45 of the abutment member, FIG. 3, and lubrication of the parts by pressure fluid reduces friction between the seal and plunger to a negligible value. Accordingly, trapped pressure fluid on the outlet side of the anti-creep mechanism 6 acts on the effective area of the valve 34' in the plunger 28 to tend to move the valve assembly 34 against the compressive force of the spring 36. It is apparent that compression of the valve spring 36 is effected solely by the action of the trapped fluid pressure rather than by the magnetic attraction between the plunger 28 and abutment member 40. If the force of the trapped fluid acting through the passage 32 on the effective area of the valve 34' is greater than the compressive force of the spring 36, the valve assembly 34 is unseated from the plunger wall to bleed down trapped fluid until the forces are equalized whereupon the valve 34' is again seated on the wall to maintain a predetermined fluid pressure trapped in the front wheel cylinders 13 to prevent forward movement of the vehicle A.

When the vehicle is accelerated, the coils 22 are de-energized and the force of the remaining trapped fluid pressure in the outlet return the plunger 28 to its retracted position thereby allowing return flow of the pressure fluid from the outlet side of the anti-creep mechanism 8 to the inlet side thereof.

It will now be apparent that the operation of the present anti-creep mechanism 6, is positive acting and permits the use of relatively smaller coils 22 since magnetic attraction between the plunger 28 and abutment member 41 is not opposed by spring forces. When the magnetic engagement is completed, a greater force is necessary to separate these parts than was required to produce engagement thereof.

This invention is intended to cover all modifications of the disclosed embodiment that will be readily apparent to all skilled in the art, and the invention is limited only by the claims which follow.

What is claimed is:

1. An anti-creep device for a brake system comprising a casing, magnetizable abutment means in said casing defining first and second chambers on opposite sides thereof, fluid passage means through said abutment means including a central opening, inlet and outlet connections to said first and second chambers, a magnetically attractable plunger freely slidable in said first chamber and having an internal chamber therein, tubular means projecting from one end wall of said plunger toward said central opening and forming a passage therethrough in communication with said internal chamber, spring loaded valve means in said internal chamber normally engaged with the one end wall of said plunger in circumscribing relation with said passage, and sealing means in said second chamber normally positioned against said abutment means, said sealing means having a central opening aligned with the central opening of said abutment means, said sealing means being movable away from said abutment means to accommodate unrestricted fluid flow from said first chamber to said second chamber, electro-responsive means for magnetizing said abutment means to attract said plunger thereto in a terminal portion of a brake application, whereby said tubular means extends through said central opening of said abutment means and forms a restricted fluid passage therebetween, and said sealing means being movable against said abutment member and into peripheral sealing engagement with said subular means in response to pressure fluid return conditions from said second chamber to said first chamber whereby pressure fluid return is through said passage and acts against said valve means in opposition to the spring force thereon.

2. Control valve means comprising a housing having an inlet and outlet, an abutment member in said housing between said inlet and outlet, and means for controlling displacement and return flow of pressure fluid between said inlet and outlet including an opening in said abutment member through which the displacement flow of pressure fluid passes, plunger means slidable in said housing on the inlet side of said member, extension means on said plunger means, annular sealing means normally urged into sealing engagement with the outlet side of said member about said opening, electro-responsive means for attracting said plunger means into magnetic engagement with said member, said extension means being movable through said opening into peripheral sealing engagement with said sealing means to prevent the return flow of displaced pressure fluid through said opening, and means in said plunger means and extension means to provide passage of limited return flow of displaced pressure fluid when the fluid pressure thereof exceeds a predetermined magnitude.

3. The control valve means according to claim 2 wherein said extension means extends into said opening, and annular passage means between said opening and extension means to provide passage of displacement flow from said inlet through said opening.

4. The control valve means according to claim 2 wherein said last named means includes passage means extending axially through said plunger means and extension means, and uni-directional valve means normally urged to a closed position in said passage means and movable to an open position to permit the limited return flow of displaced pressure fluid through said passage means when the magnitude of the fluid pressure of the displaced pressure fluid at said outlet exceeds that of the displaced pressure fluid at said inlet by the predetermined magnitude.

5. Control valve means comprising a housing having inlet and outlet ports therein, an abutment member in said housing between said ports, and means for controlling displacement and return flow of pressure fluid between said ports including a plurality of passage means in said member through which the displacement flow passes, plunger means slidable in said housing on the inlet side of said member, extension means on said plunger means, sealing means in said housing on the outlet side of said member and having an opening therethrough substantially aligned with one of said passage means, means normally urging said sealing means into sealing engagement with said member to close the other of said passage means and prevent passage of return flow of displaced pressure fluid therethrough, electro-responsive means for attracting said plunger means into magnetic engagement with said member, said extension means being movable through said one passage means and received in peripheral sealing engagement by said sealing means opening to prevent passage of return flow of displaced pressure fluid through said one passage means, and means in said plunger means and extension means to provide passage of limited return flow of displaced pressure fluid when the fluid pressure thereof exceeds a predetermined magnitude.

6. Control valve means comprising a housing having inlet and outlet ports therein, means for controlling displacement and return flow of pressure fluid between said ports including an abutment member in said housing having a centrally located opening therein normally in open pressure fluid communication with said ports, at least one passage means extending through said member and radially disposed relevant to said member opening, plunger means slidable in said housing between said inlet port and member, extension means on said plunger means, sealing means in said housing between said outlet port and member, an opening in said sealing means for receiving said extension means and substantially aligned with said member opening, resilient means biased between said housing and sealing means and normally urging said sealing means into sealing engagement with said member to close said passage means and prevent return flow of displaced pressure fluid therethrough, electro-responsive means for attracting said plunger means into magnetic engagement with said member, said extension means being movable through said member opening and sealing means opening into peripheral sealing engagement with said sealing means to prevent return flow of displaced pressure fluid through said member opening, other passage means in said plunger means and extension means between said ports, and uni-directional valve means in said other passage means responsive to a pressure differential between said ports above a predetermined magnitude to permit passage of limited return flow of displaced pressure fluid through said other passage means.

7. A control valve for pressure fluid comprising a housing, an abutment member adapted to be magnetized and defining with said housing inlet and outlet chambers, a central opening and a plurality of radially spaced passages in said member between said chambers, a magnetically attractable plunger slidable in said inlet chamber for movement to an energized position in magnetic holding engagement with said member, an extension on said plunger substantially coaxial with said central opening, annular sealing means in said outlet chamber and normally urged to a seated position in sealing engagement with said member about said central opening and closing said passages, said sealing means being movable to an unseated position in response to displacement flow of pressure fluid from said inlet chamber to said outlet chamber through said central opening and passages, electro-responsive means for magnetizing said member, said plunger being movable to the energized position into magnetic holding engagement with said member when said member is magnetized, said extension being concertly moved by said plunger to the energized position extending through said central opening and into said outlet chamber, said sealing means being subsequently urged to its seated position on said member closing said passages and into peripheral sealing engagement with said extension upon interruption of the displacement flow to prevent return flow of displaced pressure fluid from said outlet chamber to said inlet chamber through said central opening and passages, another passage extending through said plunger and extension, and valve means controlling said other passage, said valve means being movable in response to fluid pressure in said outlet chamber having a magnitude predeterminately greater than that in said inlet chamber to provide passage of limited return flow of displaced pressure fluid through said other passage from said outlet chamber to said inlet chamber.

References Cited in the file of this patent

UNITED STATES PATENTS

| | | |
|---|---|---|
| 2,285,781 | Patrick | June 9, 1942 |
| 2,345,280 | Morgan et al. | Mar. 28, 1944 |
| 2,472,544 | Nissen | June 7, 1949 |
| 2,574,821 | Forman | Nov. 13, 1951 |